United States Patent
Seo et al.

(10) Patent No.: US 10,442,439 B1
(45) Date of Patent: Oct. 15, 2019

(54) SYSTEM AND METHOD FOR ROAD FRICTION COEFFICIENT ESTIMATION

(71) Applicant: Apple Inc., Cupertino, CA (US)

(72) Inventors: YoungWoo Seo, Pleasanton, CA (US); Randol Aikin, San Francisco, CA (US); Kshitiz Garg, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 86 days.

(21) Appl. No.: 15/681,134

(22) Filed: Aug. 18, 2017

Related U.S. Application Data (60) Provisional application No. 62/376,745, filed on Aug. 18, 2016.

(51) Int. Cl.
| | |
|---|---|
| G05D 1/00 | (2006.01) |
| G05D 1/06 | (2006.01) |
| G05D 3/00 | (2006.01) |
| G06F 7/00 | (2006.01) |
| G06F 17/00 | (2019.01) |
| B60W 40/068 | (2012.01) |

(52) U.S. Cl.
CPC ........ B60W 40/068 (2013.01); *B60T 2210/12* (2013.01); *B60W 2550/148* (2013.01)

(58) Field of Classification Search
CPC ........... B60W 40/068; B60W 2550/148; B60T 2210/12
See application file for complete search history.

(56) References Cited

U.S. PATENT DOCUMENTS

| | | |
|---|---|---|
| 3,113,308 A | 12/1963 | Stavis |
| 3,918,058 A | 11/1975 | Noyori et al. |
| 3,974,500 A | 8/1976 | Goldfischer |
| 4,170,006 A | 10/1979 | Falk |
| 4,641,349 A | 2/1987 | Flom et al. |
| 4,653,316 A | 3/1987 | Fukuhara |
| 4,781,465 A | 11/1988 | Demachi et al. |
| 5,189,425 A | 2/1993 | Dabbs |
| 6,492,938 B1 | 12/2002 | Alland |
| 6,606,052 B1 | 8/2003 | Miyahara |
| 6,778,125 B1 | 8/2004 | Stewart et al. |

(Continued)

FOREIGN PATENT DOCUMENTS

| | | |
|---|---|---|
| EP | 2669633 | 12/2013 |
| EP | 2884299 | 6/2015 |

(Continued)

OTHER PUBLICATIONS

Nam, "Application of Novel Lateral Tire Force Sensors to Vehicle Parameter Estimation of Electric Vehicles," *Sensors*, 2015. vol. 15, pp. 28385-28401.

(Continued)

*Primary Examiner* — Mussa A Shaawat
(74) *Attorney, Agent, or Firm* — Polsinelli PC (57) ABSTRACT

Aspects of the present disclosure involve systems and methods for obtaining real-time road friction coefficient estimations. In one embodiment, a regression function is learned using a training data set which correlates input data measurements arriving from onboard system sensors and coefficient estimations arriving from an extension system. In another embodiment, the learned regression function can be retrieved to obtain real-time road friction coefficient estimations while the system is in motion.

29 Claims, 6 Drawing Sheets

(56) References Cited

U.S. PATENT DOCUMENTS

| | | | |
|---|---|---|---|
| 7,421,334 B2 | 9/2008 | Dahlgren et al. | |
| 7,545,313 B2 | 6/2009 | Okamura et al. | |
| 8,063,797 B1 | 11/2011 | Sonnabend et al. | |
| 8,718,861 B1 | 5/2014 | Montemerlo et al. | |
| 8,941,739 B2 | 1/2015 | Yoo | |
| 8,994,928 B2 | 3/2015 | Shiraishi | |
| 9,024,809 B2 | 5/2015 | Testar | |
| 10,247,816 B1 | 4/2019 | Hoffmann et al. | |
| 2001/0054976 A1 | 12/2001 | Sauer | |
| 2002/0176608 A1 | 11/2002 | Rose | |
| 2007/0090991 A1 | 4/2007 | Yoshikawa et al. | |
| 2007/0142996 A1* | 6/2007 | Lee | B60T 7/22 701/96 |
| 2008/0071465 A1 | 3/2008 | Chapman et al. | |
| 2008/0122680 A1 | 5/2008 | Morinaga et al. | |
| 2009/0201193 A1 | 8/2009 | Hilsebecher et al. | |
| 2009/0271101 A1 | 10/2009 | Relyea et al. | |
| 2010/0131145 A1* | 5/2010 | Ryu | B60T 8/172 701/31.4 |
| 2010/0131146 A1* | 5/2010 | Nardi | B60T 8/172 701/31.4 |
| 2010/0131229 A1* | 5/2010 | Nardi | B60T 8/172 702/142 |
| 2010/0250056 A1* | 9/2010 | Perkins | B60T 8/172 701/33.4 |
| 2011/0060478 A1 | 3/2011 | Nickolaou | |
| 2014/0297092 A1 | 10/2014 | Delp | |
| 2014/0343842 A1 | 11/2014 | Ranganathan et al. | |
| 2015/0070207 A1 | 3/2015 | Millar et al. | |
| 2015/0285712 A1* | 10/2015 | Singh | G01M 17/02 73/8 |
| 2015/0291027 A1* | 10/2015 | Strasser | B60K 23/08 701/69 |
| 2015/0369912 A1 | 12/2015 | Kishigami et al. | |
| 2016/0042644 A1 | 2/2016 | Velusamy | |
| 2016/0110997 A1 | 4/2016 | Ur et al. | |
| 2016/0133130 A1* | 5/2016 | Grimm | H04L 67/22 340/905 |
| 2016/0133131 A1* | 5/2016 | Grimm | B60W 40/068 701/117 |
| 2016/0274239 A1 | 9/2016 | Gupta et al. | |
| 2016/0321926 A1 | 11/2016 | Mayer et al. | |
| 2017/0010184 A1* | 1/2017 | Singh | B60C 19/00 |
| 2017/0225688 A1* | 8/2017 | Milanese | B60W 30/02 |
| 2017/0344010 A1 | 11/2017 | Rander et al. | |
| 2018/0015931 A1* | 1/2018 | Berntorp | B60W 40/12 |
| 2018/0121833 A1 | 5/2018 | Friedman et al. | |
| 2018/0174454 A1 | 6/2018 | Tiwaree et al. | |
| 2018/0276832 A1 | 9/2018 | Aikin | |
| 2018/0276847 A1 | 9/2018 | Last et al. | |
| 2018/0283895 A1 | 10/2018 | Aikin et al. | |

FOREIGN PATENT DOCUMENTS

| | | |
|---|---|---|
| WO | WO 2009/147406 | 12/2009 |
| WO | WO 2010/134824 | 11/2010 |
| WO | WO 2012/062764 | 5/2012 |
| WO | WO 2012/136494 | 10/2012 |
| WO | WO 2017/208670 | 12/2017 |

OTHER PUBLICATIONS

Condliffe, Jamie, "Road Trip Planner Lets You Choose a Route With the Best Weather." Jun. 19, 2012, https://gizmodo.com/5919495/5919495/road-trip-planner-lets-you-choose-a-route-with-the-best-weather, accessed Mar. 21, 2018.

Google Play, "Weather Route—FREE," App description, https://play.google.com/store/apps/details?id=com.voyagegames.weatherroute&hl=en, accessed Mar. 21, 2018.

Garun, Natt, "Weather Channel's road trip planner helps predict the forecast along your drive," Jun. 19, 2012, https://www.digitaltrends.com/home/weather-channels-road-trip-planner/, accessed Mar. 21, 2018.

App Store Preview, "inRoute Route Planner," Carob Apps, LLC, https://itunes.apple.com/us/app/inroute-intelligent-route/id703796787?mt=8, accessed Mar. 21, 2018.

Shen et al., "A Fast Alternative for Template Matching: An ObjectCode Method," 2013 Second IAPR Asian Conference on Pattern Recognition, IEEE, Nov. 5, 2013, pp. 425-429.

Coyle, John, "Jaguar Land Rover's 'Pothole Alert' Warns About Hated Hazard," Jun. 10, 2015, http://www.motorauthority.com/news/1098673_jaguar-land-rovers-pothole-alert-warns-about-hated-hazard, accessed Sep. 12, 2016.

Revolta, Doug, "Pothole detection system showcased by Jaguar Land Rover," Jun. 17, 2015, http://www.autocar.co.uk/car-news/new-cars/pothole-detection-system-showcased-jaguar-land-rover, accessed Jun. 18, 2015.

* cited by examiner

SYSTEM AND METHOD FOR ROAD FRICTION COEFFICIENT ESTIMATION

CROSS REFERENCE TO RELATED APPLICATIONS

This application is related to and claims priority under 35 U.S.C. § 119(e) from U.S. Patent Application No. 62/376,745 filed Aug. 18, 2016, titled "A SYSTEM AND METHOD FOR ROAD FRICTION COEFFICIENT ESTIMATION," the entire contents of each are incorporated herein by reference for all purposes

TECHNICAL FIELD

This disclosure relates generally to road vehicles, and more specifically to a method for estimating a friction coefficient of a road surface driven by a vehicle.

BACKGROUND

Advanced driver assistance systems (ADAS) are subsystems to automate, adapt, and enhance a vehicle's control system for better driving. Generally, the ADAS system relies on inputs from multiple data sources located onboard a vehicle to alert or enable safeguards that aid in controlling the vehicle. A valuable parameter for ADAS and autonomous vehicular operation is road friction, which may influence following distance, vehicle speed, and driver intervention time and distance. Wheel slip, which is a function of road friction, is a vehicular dynamic that can be used to estimate road friction and control vehicle tractive forces. However, estimating road friction in this manner may necessitate an excitation on the vehicle, such as engagement of the brakes. This type of road friction estimation generally cannot estimate road friction on the road ahead of the vehicle's current position, or may not provide a reliable estimate during straight-line driving, when no excitation is present.

SUMMARY

One implementation of the present disclosure may take the form of a method for managing device operation. The method may include the operations of receiving lateral force measurements from a first device connection to a first vehicle as the first device is in communication with a road surface, estimating road friction coefficients of the road surface based at least on the received lateral force measurements, and collecting a first set of road surface characteristics sensor measurements from a first set of sensors of the first vehicle. The method may also include the operations of combining the estimated road friction coefficients and the collected first set of road surface characteristics sensor measurements to generate a training data set associated with operation of the first vehicle, deriving a regression function from the training data set, wherein the regression function predicts real-time road friction coefficients of the road surface, and storing the regression function in a remote server in communication with the first vehicle through a communication network. Another implementation may take the form of a computer-readable data storage medium comprising instructions that, when executed by at least one processor of a first vehicle, cause the first vehicle to perform the operations of the method.

Another implementation of the present disclosure may take the form of a system comprising a first device connected to a first vehicle, a first set of sensors detecting a first set of road surface characteristics sensor measurements, a processor, and non-transitory computer-readable medium storing instructions. When the instructions of the non-transitory computer-readable medium are executed, the processor performs the operations of obtaining an estimated road friction coefficients of a road surface from lateral force measurements acquired from the first device as the first device is in communication with the road surface, receiving the first set of road surface characteristics sensor measurements from the first set of sensors, and generating a training data set associated with the first vehicle using the estimated road friction coefficients and the collected first set of road surface characteristics sensor measurements. The instructions further cause the processor to derive a regression function from the training data set, wherein the regression function predicts real-time road friction coefficients of the road surface and store the regression function in a remote server in communication with the first vehicle through a communication network.

BRIEF DESCRIPTION OF THE DRAWINGS

Example implementations are illustrated in referenced figures of the drawings. It is intended that the implementations and figures disclosed herein are to be considered illustrative rather than limiting.

DETAILED DESCRIPTION

Aspects of the present disclosure involve systems, methods, devices and the like for obtaining real-time friction coefficient estimations of a road surface. In one embodiment, a regression function is learned using a training data set which correlates input data measurements arriving from onboard system sensors and estimated road-friction coefficients for that input data measurement arriving from an extension system. The learned regression function can be used to predict real-time road friction coefficients. The road friction estimate can be associated with specific regions around the vehicle, enabling prediction of road friction of the road ahead of a vehicle. In one embodiment, the onboard system sensors may be light detection and ranging (LIDAR) sensors, radio detection and ranging (RADAR) sensors, cameras and the like, located on a system like a vehicle that can be used to capture the road surface characteristics. The extension system can be a trailer or other device equipped with components that measure a lateral force on the wheels of the extension system for use in obtaining the coefficient estimates of the extension system. The learned regression function can then be utilized to obtain real-time or online road friction coefficient estimations while the system is in motion. Once learned, the system may be detached from an extension system and utilize the onboard sensors to update the learned regression function for real-time road friction coefficient estimation to aid the system during operation of the system.

In another embodiment, the regression function is learned using a training data set which correlates input data measurements arriving from onboard system sensors and coefficient estimations obtained using kinematic measurements determined through mechanical components onboard the system. The onboard system sensors can be sensors such as LIDAR sensors, RADAR sensors, cameras and the like, located on a system like a vehicle that can be used to capture the road surface characteristics. The mechanical components can be kinematic sensors that can be used to measure road surface friction. The learned regression function can then be utilized to obtain real-time road friction coefficients while the system is in motion. Conventionally, systems (e.g., vehicles) have solely relied on multiple data sources located onboard to obtain road friction coefficient estimations. Such data sources can include sensors and other similar detection components that can provide characteristics about the road. However, in these systems, the estimation of the road friction coefficients has often been performed in response to an event or trigger, such as a forceful application of the brakes.

Figure 1:
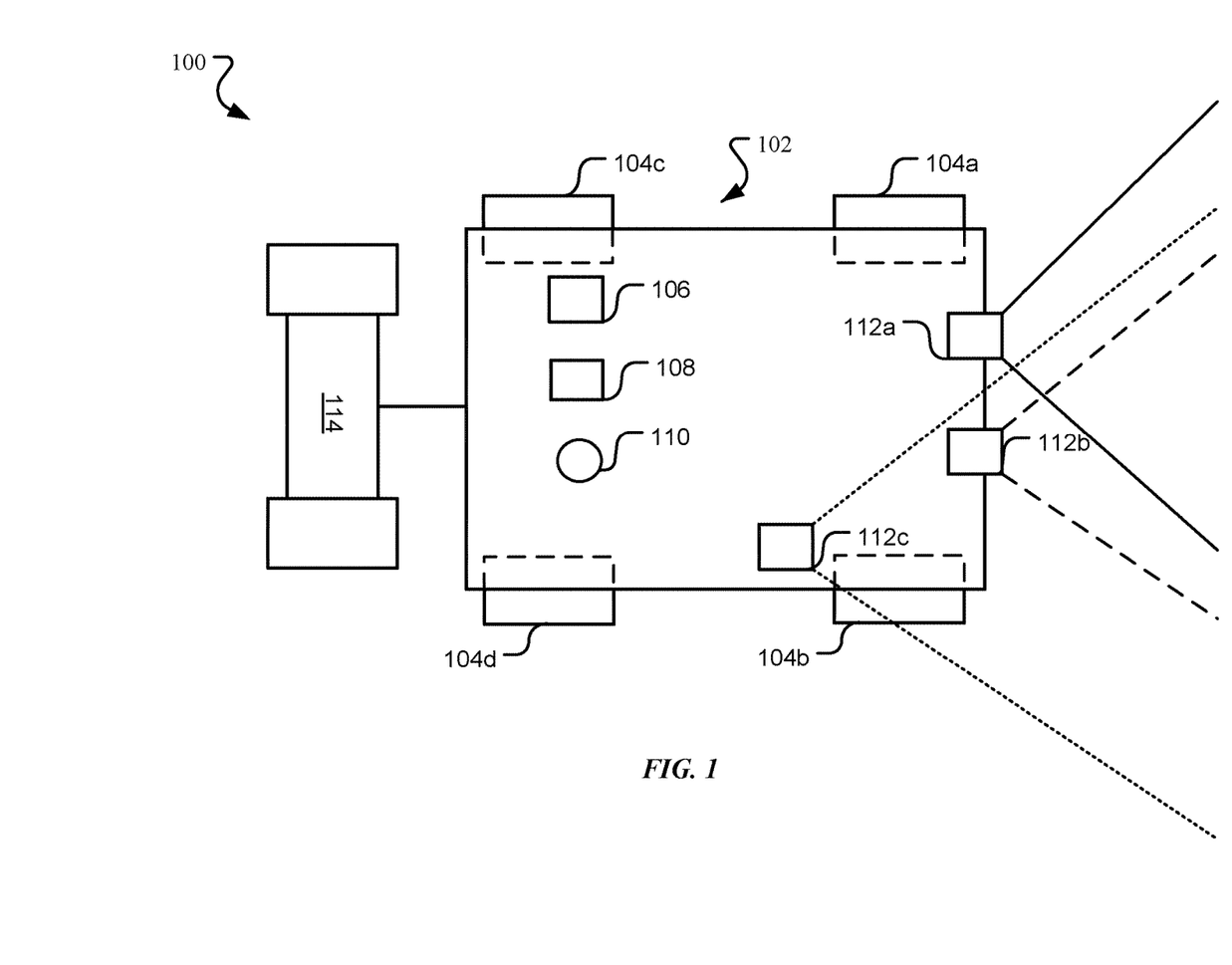
FIG. 1 is a diagram illustrating a system with onboard sensors and a coupled extension system for automatic road friction coefficient estimation.

To achieve a more precise estimation of the road characteristics, a system for automating road surface friction coefficient estimation is provided. FIG. 1 illustrates system 100 used for automatically estimating friction coefficients of a road surface. In one embodiment, system 100 includes transport system 102 coupled to extension system 114 for obtaining the road surface characteristics. The transport system 102 can be a road vehicle, a motorcycle, a truck, a recreational vehicle, or any other type of transport system that can benefit from the use of an ADAS system. For example, the transport system 102 can be a road vehicle equipped with four wheels 104a-104d.

As discussed herein, the road surface characteristics may be obtained through inputs received from one or more sensors. In general, a sensor is a transducer that is used to detect characteristics within the environment. Systems 102 and extension system 114 can be equipped with various onboard sensors and other data sources including, but not limited to, weather/temperature sensors 106, inertial measurement units (IMUs) 108, global navigation satellite systems (GNSS) 110, LIDAR 112a, RADAR 112b, and cameras 112c. To obtain the road characteristics, sensors 106-112c can be used to gather road surface characteristics that can be processed by the system 102. The road characteristics captured can be described by an n-dimensional vector of numerical values that represent an object referred herein as a "feature vector". LIDAR 112a, for example, is a surveying sensor that emits a pulsing laser in the form of a light to obtain distance measurements. Specifically, LIDAR 112a is an instrument that shines a narrow and focused light on the road surface and measures the time it takes for the light to return or bounce back to the sensor. Since light travels at a constant speed, the LIDAR sensor 112a is able to calculate the distance between itself and the target. Therefore, dips on the road, rugged terrain, etc., will have varying measurements/characteristics as the return time will differ with the varying road features. Road characteristics received from the LIDAR sensor 112a can be described in terms of a LIDAR feature vector $f_{LIDAR}(t, L)$ which corresponds to the received surface reflectance from the set of LIDAR scan points acquired at a given time t. Similarly, RADAR 112b is a detection technology that uses radio waves to determine angles, velocity, or range in objects. RADAR 112b is an instrument that shines a radio wave on the road surface and, much like LIDAR, measures the time it takes for the radio wave to return to the sensor. Road characteristics received from the RADAR sensor 112b can be described in terms of a RADAR feature vector $f_{RADAR}(t, R)$ which corresponds to the recorded surface reflectance from the set of RADAR target points received at a time t. A camera 112c is a passive sensing technology that captures images of objects given ambient light. Road characteristics received from the camera 112c can also be described in terms of a camera feature vector $f_{camera}(t, c)$ which correspond the recorded road surface texture of the road from a set of camera images received at a time t. The acquisition of the data points of the sensors 112a-112c of the system 102 may be combined into a joint multi-variant vector F(t) that describes all the road surface characteristics acquired from the sensors 106-112c. Since the data points are acquired from various sensors during operation of the system 102, the multi-variant feature vector F(t) can be described as a real valued, multi-dimensional vector with road surface characteristics in multi-modalities. Note that although LIDAR 112a, RADAR 112b, and a camera 112c are the sensors used to create the multi-variant multi-dimensional feature vector F(t), the process is not limited and other sensors and/or data capturing sources may be used.

As indicated above, an extension system 114 can be coupled to transport system 102. In one embodiment, the extension system 114 can be a trailer that is attached to the transport system (e.g., vehicle) 102 for use in attaining estimated road surface friction coefficients. Extension system 114 can be equipped with numerous sensors and other data capturing sources (similar to the same to the sensors 106-112c described above) that can collect road surface characteristic while the extension system 114 is in motion. In one particular embodiment, extension system 114 can be a trailer attached to a moving vehicle (e.g. system 102) and equipped with any sensor or component that can be used to provide a lateral force measurement at various sampling cycles as the trailer is in motion. The lateral force measurements received can then be used to compute estimated road friction coefficients $\hat{\mu}(t, x)$ of a surface as the extension system 114 is being pulled over the surface by the transport system 102. In some instances, the transport system 102 may also have a GNSS/inertial navigation sensor 110 that enables geolocation of the vehicle as a function of time. Thus, the estimated road friction coefficients $\hat{\mu}(t, x)$ of the surface determined by the extension system 114 can then be used to describe the road friction coefficient at a particular location x (obtained through the GNSS sensor 110) and time t, (x, t). For example, an estimate road friction coefficient $\hat{\mu}(t, x)$ of 0.65 can be associated with a particular GPS location obtained at a particular time for future use of a vehicle or other device, as explained in more detail below.

Once the data measurements have been collected from the transport system 102 and/or extension system 114, the data is combined and processed to obtain a learned regression function for automatic road friction coefficient estimation. The learned regression function describes the latent relationship between the road surface characteristics of feature vector F(t) captured by the onboard sensors on the transport system 102 and the estimated road friction coefficients $\hat{\mu}(t, x)$ obtained by the extension system 114. To obtain the learned regression function, the estimated road friction coefficients $\hat{\mu}(t, x)$ obtained from the extension system 114 are first transferred to a processor on the transport system 102. The processor (e.g., regression processor 408 in FIG. 4) then takes the collected data (road surface characteristics in feature vector F(t) and estimated road friction coefficients $\hat{\mu}(t,x)$) and pairs the estimated road friction coefficients $\hat{\mu}(t, x)$ with the corresponding road surface coefficients F(t). The processor is described in more detail and in conjunction with FIG. 4 below. Using this data, a resulting training data set can be acquired as a learned regression function $\hat{f}(\mu(t, x), F(t, x))$. The learned regression function $\hat{f}(\mu(t, x), F(t, x))$ is developed such that the function explains the correlation between the sensor measurements (e.g., road surface characteristics F(t)) and the estimated road friction coefficients $\hat{\mu}(t, x)$. In other words, the measured road surface characteristics and the estimated road friction coefficients are compared by the processor 408. Based on that comparison, the estimated road friction coefficients may be adjusted to provide a more accurate estimation. Through this process occurring multiple times, the estimated road friction coefficients are adjusted or "learned", becoming more accurate in estimating actual friction conditions of a surface. Further, the learned regression function $\hat{f}(\mu(t, x), F(t, x))$ can be developed such that the real-time road friction coefficient computed by the function falls within the interval of [0, 1]. For example, an asphalt road can be computed to have a road friction coefficient of 0.7. Other road surface types may be associated with a different road friction coefficient.

Once the learned regression function $\hat{f}(\mu(t, x), F(t, x))$ has been determined, the function $\hat{f}(\mu(t, x), F(t, x))$ can be made available and retrieved at a later time for automatically estimating the road friction coefficients of a transport system 102 at a particular location. As the learned regression function provides a correlation between measured road surface characteristics F(t) and estimated road friction coefficients $\hat{\mu}(t, x)$ at a specific time and location, road surface friction coefficients may be determined or calculated at a later time by a vehicle 102 or other system without the need for the extension system 114. In other words, the extension system 114 provides for the determination of the learned regression function that can later be used to aid a system 102 in determining an estimated friction quality to the surface. Note that other real-time road friction coefficient estimation methods can be contemplated using machine learning algorithms commonly known in the art.

Figure 2:
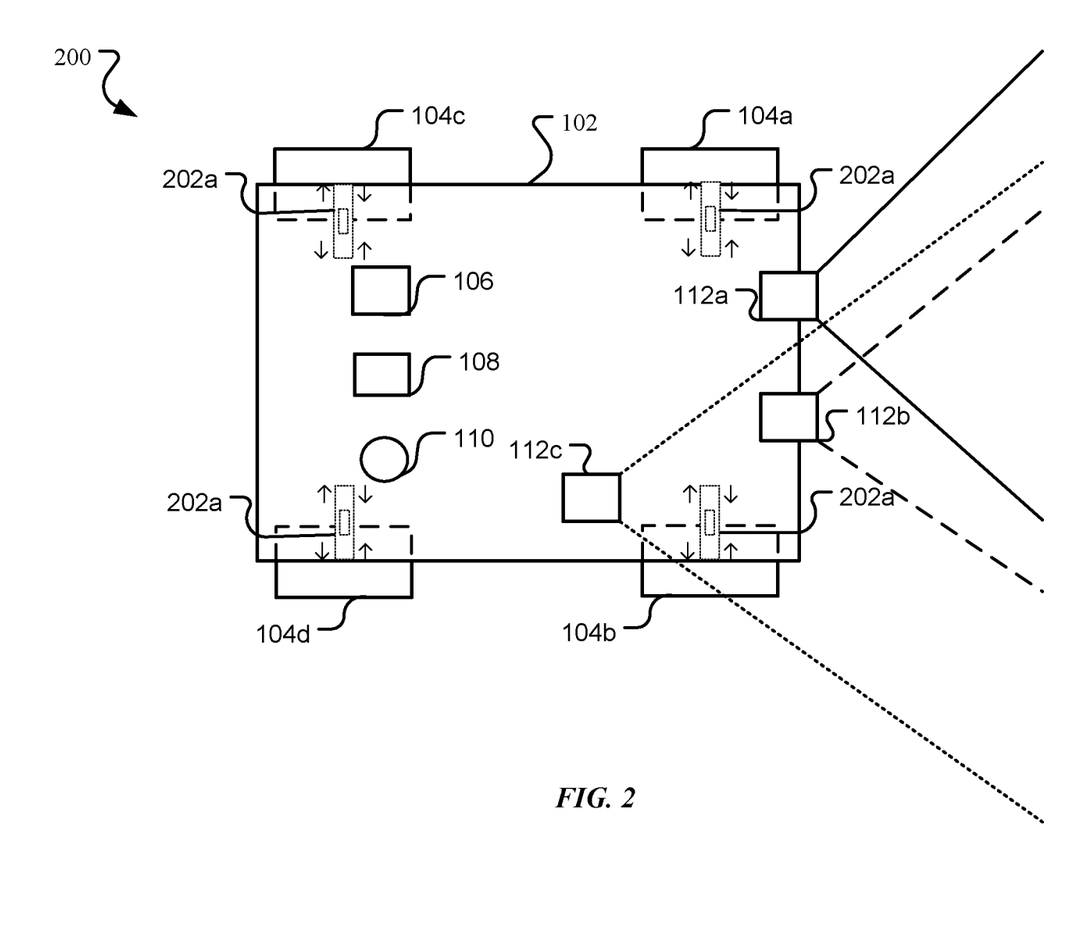
FIG. 2 is a diagram illustrating a system with onboard sensors and other data sources used for automatic road friction coefficient estimation.

FIG. 2 illustrates transport system 102 without the use of extension system 114. Specifically, FIG. 2 is a diagram illustrating the transport system 102 with onboard sensors 106-110 and other data sources 202a-202d used for automatic road friction coefficient estimation. In one embodiment, transport system 102 is a road vehicle with onboard sensors 112a-112c that may be used for obtaining the real-time road friction coefficients. For example, the road vehicle, while traveling on a road, can use the onboard sensors 112a-112c to obtain current measured road surface characteristics. The road vehicle 102 then retrieves or otherwise obtains the learned regression function calculated as described above and, utilizing the current road surface characteristics and the learned regression function, automatically determines real-time road friction coefficients for the measured location or road surface. Using the determined real-time road friction coefficients, appropriate adjustments can be made by an ADAS system in the road vehicle for improved vehicle control, such as during braking of the vehicle.

Additionally or alternatively, other data sources can be used in conjunction with the regression function to fine tune the coefficients during operation of the transport system 102. In one embodiment, a weather/temperature sensor 106, an IMU 108, a GNSS 110, and other such data sources can be used for improved coefficient approximation. For example, the GNSS 110 system can be a GPS system whose location and time information can provide a closer correlation and approximation of the road friction coefficients using the retrieved regression function. As another example, the IMU 108 located on the transport system 102 can provide acceleration and rotational attributes that can help provide a better characterization of the driving conditions for better road coefficient approximation. Still as another example, the temperature/weather sensor 106 can be used for more accurate coefficient approximation as a wet, icy, or dry road can have different road friction coefficients. Note that more or less data sources, including but not limited to, IMUs 108, temperature sensors 106, GNSS systems 110, image processing, computer vision, and in-system networking, can be collectively used with the onboard sensors 112a-112c for predicting the road friction coefficients. Also note that the learned regression function can also be further fine-tuned as more information regarding road surface characteristics is acquired by these and other sources and/or shared between one or more transport systems 102 in a fleet via a wireless network and/or shared on a cloud/remote server.

FIG. 2 also illustrates mechanical components 202a-202d that can include, but are not limited to, strain gauges, wheel speed sensors, hub force sensors, yaw sensors, and gyroscopic sensors that may reside onboard or as an extension to transport system 102. The mechanical components 202a-202d can provide speed, velocity, and acceleration characteristics that can be used in conjunction with the extension system 114 and onboard sensors 112a-112c for better characterization of the learned regression function $\hat{f}(\mu(t, x), F(t, x))$. For example, strain gauges can be used to measure the self-aligning force/torque on the wheels 104a-104d which can be used to infer road friction. As another example, longitudinal and lateral force at the wheels 102a-102d can be measured using wheel speed sensors and hub force sensors respectively. Thus, with the measurements from these mechanical sensors, the learned regression function $\hat{f}(\mu(t, x), F(t, x))$ can be augmented by the characteristics obtained by the mechanical components 202a-202d to provide a closer estimation of the real-time road friction coefficients during operation of transport system 102.

Alternatively, the mechanical components 202a-202d can be used instead of the extension system 114 to provide estimated road friction coefficients. In one embodiment, the mechanical components 202a-202d can be used for determining the estimated road friction coefficients $\hat{\mu}(t, x)$ for specific times and locations, while the onboard sensors 112a-112c are used for the road surface characteristics F(t). Using both data sets (e.g., road friction coefficients $\hat{\mu}(t, x)$ and road surface characteristics F(t)), a training data set can be determined which leads to the learned regression function $\hat{f}(\mu(t, x), F(t, x))$ for estimating real-time road friction coefficients. In some instances, the kinematic measurements may be obtained from the mechanical components 202a-202d onboard the transport system 102 and can serve as the training data for the learned regression function $\hat{f}(\mu(t, x), F(t, x))$. In other instances, kinematic measurements can be obtained from mechanical components 202a-202d located onboard a secondary transport system 102. That is to say, the kinematic measurements may be acquired over time and shared between transport systems 102 in a fleet. Therefore, the kinematic measurements collected by one or more secondary transport systems 102 can be shared. Additionally, the road characteristics acquired from the onboard sensors 112a-112c as well as other measurements (e.g., braking) acquired by the transport system 102 can be shared. Thus, over time the automatic road friction coefficient estimation can be improved in granularity as the training data set increases with the addition of more measurements shared between transport systems 102 over wider geographical areas under a range of road conditions.

In one embodiment, the data collected (e.g., road surface characteristics, measurements, and learned regression function) is stored in a remote server in a network accessible by the transport system/vehicle for accessing and populating by various transport systems 102. For example, road vehicle A captures road surface characteristics/features of Highway A heading south, and the characteristics are then shared by road vehicle B as it heads north on Highway A at a later time. Therefore, the real-time road friction coefficient estimation of road vehicle B is improved by the data collected by road vehicle A. The remote server can function as a server for on-demand computing, where data and collective computing can be shared between devices on demand. For example, the road surface characteristics can be place in a data structure on the remote server that may be accessed by other transport systems 102 for more precise road friction coefficient estimation. As another example, the learned regression function can be held in the remote server/cloud such that other transport systems 102 may retrieve the regression function for online road friction coefficient determination.

In another embodiment, the data collected can be stored in a wired/wireless network accessible by other transport systems 102 able to connect to it. For example, vehicular communication systems can be used as a network in which two or more vehicles can "talk" to each other. In a vehicular communication system, the vehicles can be considered nodes that provide each other with information including road surface characteristics. In the vehicular communication system, the communication between vehicles can use vehicle-to-vehicle (V2V) technology where a vehicular ad hoc network can be formed between vehicles that enable the exchange of information between the vehicles. As another example, the vehicle can be equipped with internet access and/or a wireless local area network (WLAN) that allows the vehicle to share internet access with other devices (e.g., tablets, smartphones, etc.) and/or systems (e.g., other vehicles). Still as another example, an ad hoc network can be used to exchange information using the interconnection of multiple networks (e.g., cellular, WLAN, etc.) within the vicinity of the vehicle(s).

Figure 3A:
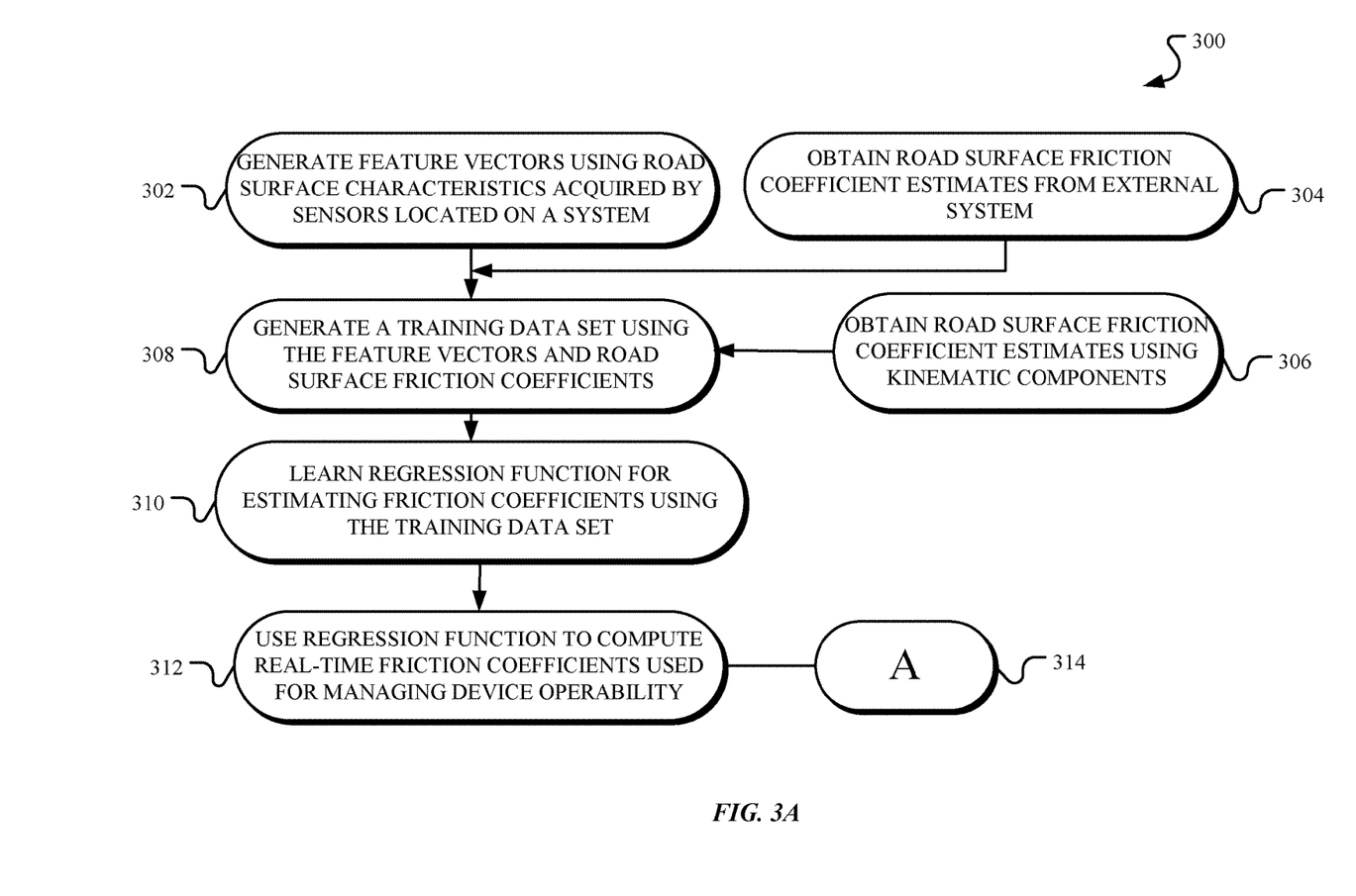
FIG. 3A is a flowchart of a method for defining a regression function that can be used for computing real-time road friction coefficients.
Figure 3B:
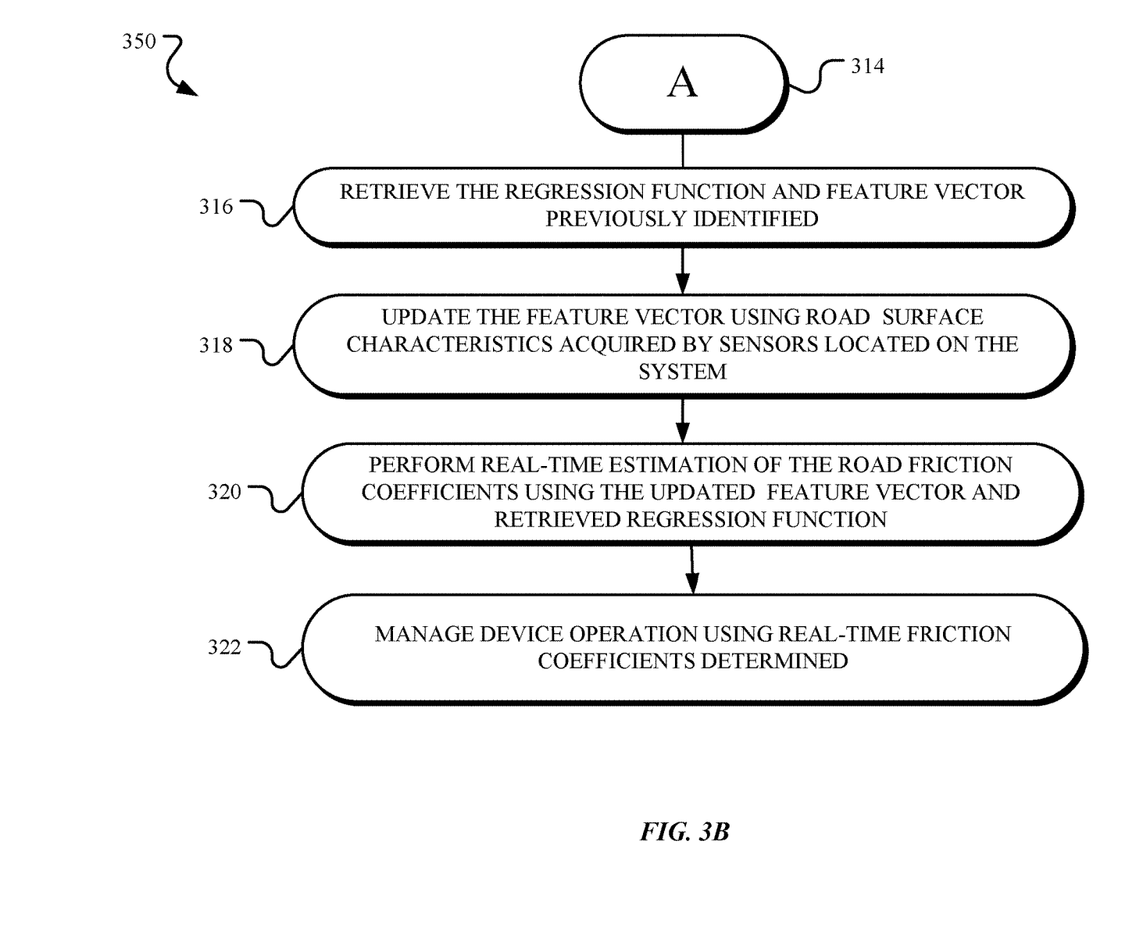
FIG. 3B is a flowchart of a method for using the regression function to manage system operation using the real-time road coefficients computed.

FIGS. 3A-3B are flowcharts of methods for determining and using a learned regression function for automatic real-time road friction coefficient estimation. Specifically, FIG. 3A is a flowchart of a method 300 for determining the learned regression function. In this process, method 300 begins with operation 302 where onboard sensors located on a transport system 102 gather road surface characteristics. The road surface characteristics can be captured by sensors including at least LIDAR, RADAR, and cameras located onboard the transport system 102 (e.g., vehicle). The road surface characteristics received from the sensors can be described in terms of a feature vector. For example, a LIDAR feature vector $f_{LIDAR}$ (t, L) can correspond to recorded surface reflectance from the set of LIDAR scan points acquired at a given time t. Similarly, a RADAR feature vector $f_{RADAR}$ (t, R) can correspond to the recorded surface reflectance from the set of RADAR target points received at a time t. Jointly, the feature vectors received results in a joint multi-variant vector F(t) that describes all the road surface characteristics acquired.

Once the road surface characteristics are acquired, method 300 continues to operation 304, where an external system 114 can be used to obtain road surface friction coefficient estimates at corresponding times t and locations x. Operation 304 includes the use of an external system 114 to measure the lateral force on a road surface and then use the measurements to estimate the friction coefficient of the road surface. In some instances, the external system 114 can be a trailer that is coupled to a road vehicle and is taking measurements and estimating road friction coefficients while in motion. The estimated road friction coefficients can be provided to the transport system for determining the regression function of method 300.

Additionally or alternatively, kinematic measurements can be acquired by mechanical components for use in determining the regression function. The kinematic measurements can be acquired by components such as string gauges, wheel speed sensors, and hub force sensors located onboard the transport system 102 or as an extension of the transport system 102. These measurements can be used to augment or replace the road coefficient estimations acquired by the extension system 114.

In operation 308, the collected data obtained from the onboard sensors 112a-112c, extension system 114, and/or mechanical components 114a-114d is correlated such that a training data set is generated. That is to say, the collected data is paired such that the estimated friction coefficients have corresponding road surface characteristic measurements to create a training data set.

In operation 310, the training data set is used to learn a regression function that can be used for estimating friction coefficients. The regression function can be learned using a machine learning technique using regression analysis and pattern recognition such that a relationship is estimated between variables and friction coefficient (e.g., estimated friction coefficients and road surface characteristics). The regression function can be a function that explains the correlation between the estimated friction coefficients and the road surface characteristics. The function can be obtained using a training data set which correlates road surface characteristics obtained by onboard sensors on a transport system 102 and estimated road friction coefficients obtained by an extension system coupled to transport system 102.

Once the a learned regression function is available, method 300 continues to operation 312 where the regression function is retrieved and used to compute real-time friction coefficients used for managing device operability. The retrieval and application of the learned regression function used to compute the real-time friction coefficients is developed in operation 314 and explained in method 350 and in conjunction with FIG. 3B. Note that retrieval of the regression function can occur at a later time and without the use of extension system 114.

FIG. 3B is a flowchart of a method for using the learned regression function to manage system operation using the real-time road coefficients computed. Specifically, FIG. 3B is an implementation of the retrieval and use of the learned regression function from method 300 of FIG. 3A. Note that FIG. 3B is but one implementation of the use of the learned regression function and other methods are contemplated.

In FIG. 3B, method 350 begins with operation 316 with the retrieval of the regression function that was previously identified. As indicated above, a regression function is a function that is learned based on correlation between road surface characteristics and estimated friction coefficients. The road surface characteristics and estimated friction coefficients can be obtained using a combination of onboard sensors, extension systems, and/or mechanical components located on the current transport system 102 and/or other transport system. The measurements obtained generate the training data used to identify the learned regression function.

In operation 318, an updated multi-dimensional feature vector is obtained using onboard sensors 112a-112c located on the transport system 102. As the transport system 102 is in motion, the onboard sensors 112a-112c can be enabled to collect road surface characteristics. As new characteristics are obtained, an updated multi-variant, multi-dimensional feature vector can be obtained whose measurements are updated based on the collected road surface characteristics.

In operation 320, the real-time road friction coefficient estimation is performed using the retrieved regression function and applying the updated feature vector. Here, the updated feature vector is plugged into the retrieved regression function to obtain an output corresponding to the real-time or online road friction coefficients. Note that the real-time coefficient calculation can be performed while the transport system 102 is in motion such that the road friction coefficients are computed based on the current road surface characteristics.

Once the real-time road friction coefficients have been estimated, method 350 concludes with operation 322, where the operability of transport system 102 can be updated based on the real-time estimations received. For example, the ADAS system on a vehicle can use the road friction coefficients to better manage control of a vehicle based on the measured road conditions.

Figure 4:
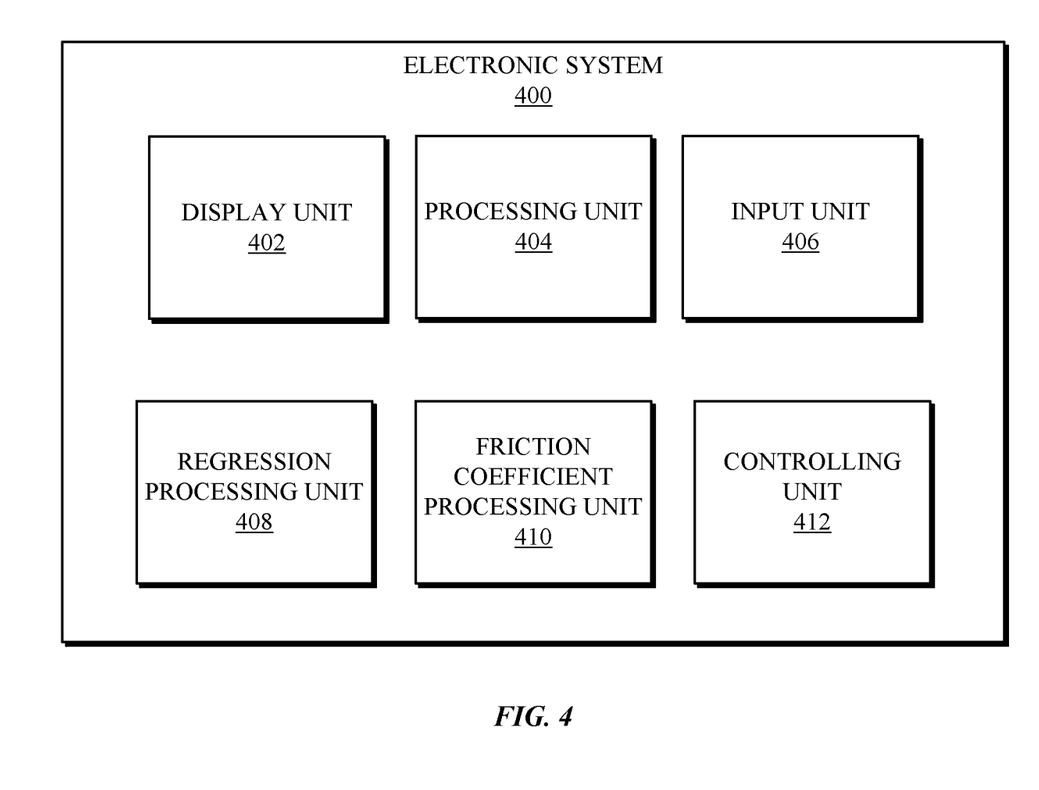
FIG. 4 is a functional block diagram of an electronic system including operational units arranged to perform various operations of the presently disclosed technology.

Turning to FIG. 4, an electronic system 400 including operational units 402-412 arranged to perform various operations of the presently disclosed technology is shown. The operational units 402-412 of the electronic system 400 are implemented by hardware or a combination of hardware and software to carry out the principles of the present disclosure. In one embodiment, the electronic system 400 can be a subsystem of transport system 102. It will be understood by persons of skill in the art that the operational units 402-412 described in FIG. 4 may be combined or separated into sub-blocks to implement the principles of the present disclosure. Therefore, the description herein supports any possible combination or separation or further definition of the operational units 402-412.

In one implementation, the electronic system 400 includes a display unit 402 configured to display information, such as a graphical user interface, and a processing unit 404 in communication with the display unit 402 and an input unit 406 configured to receive data from one or more input devices or systems. Various operations described herein may be implemented by the processing unit 404 using data received by the input unit 406 to output information for display using the display unit 402.

Additionally, in one implementation, the electronic system 400 includes units implementing the operations described with respect to FIGS. 3A-3B. For example, the operations 302-310 may be implemented by a regression processor 408, and the operations 312 and 320 may be implemented by a friction coefficient processor 410. The regression processor 408 may include various other units each implementing one of the operations 302-310. For example, the regression processor 408 may include a collecting unit for implementing the operations 302, 304, and 306, a training unit for implementing the operation 308, and a determining unit for implementing the learned operation 310. In some implementations, a controlling unit 412 implements various operations for controlling the operation of a transport system 012 (e.g., vehicle) based on the operations implemented by the friction coefficient processor 410.

Figure 5:
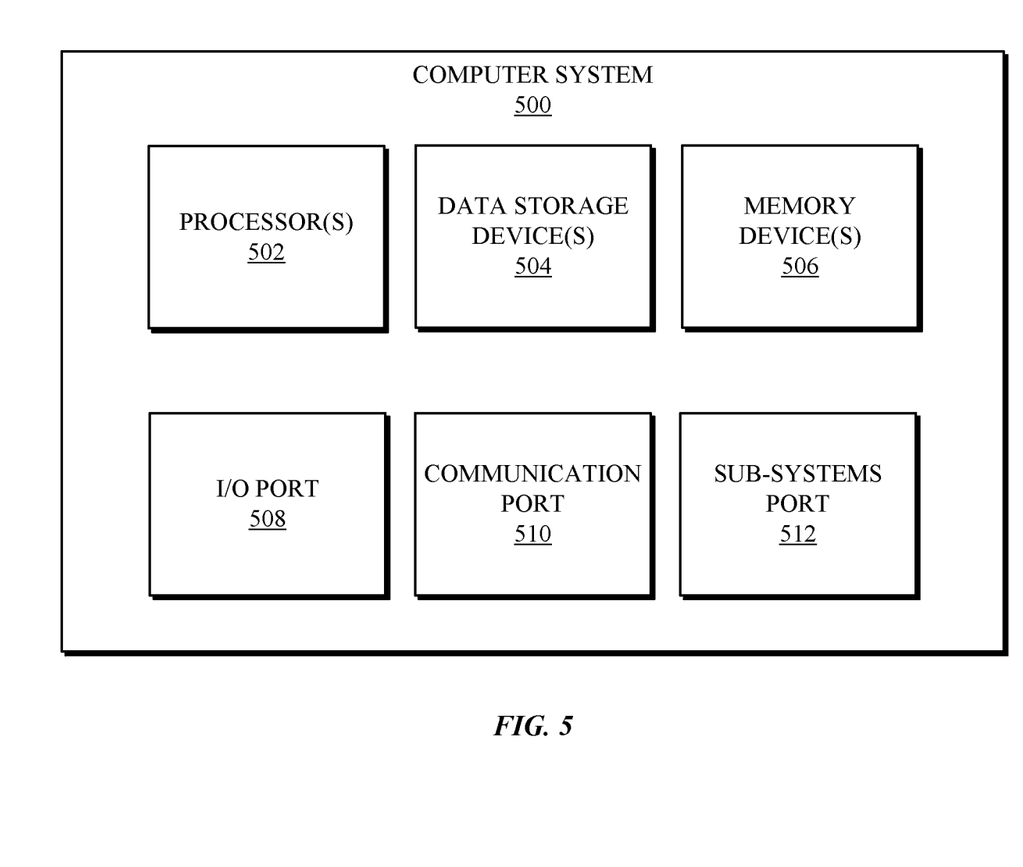
FIG. 5 is an example computing system that may implement various systems and methods of the presently disclosed technology.

Referring to FIG. 5, a detailed description of an example computing system 500 having one or more computing units that may implement various systems and methods discussed herein is provided. The computing system 500 may be applicable to the transport system 102 and other computing or network devices. It will be appreciated that specific implementations of these devices may be of differing possible specific computing architectures not all of which are specifically discussed herein but will be understood by those of ordinary skill in the art.

The computer system 500 may be a computing system is capable of executing a computer program product to execute a computer process. Data and program files may be input to the computer system 500, which reads the files and executes the programs therein. Some of the elements of the computer system 500 are shown in FIG. 5, including one or more hardware processors 502, one or more data storage devices 504, one or more memory devices 506, and/or one or more ports 508-512. Additionally, other elements that will be recognized by those skilled in the art may be included in the computing system 500 but are not explicitly depicted in FIG. 5 or discussed further herein. Various elements of the computer system 500 may communicate with one another by way of one or more communication buses, point-to-point communication paths, or other communication means not explicitly depicted in FIG. 5.

The processor 502 may include, for example, a central processing unit (CPU), a microprocessor, a microcontroller, a digital signal processor (DSP), and/or one or more internal levels of cache. There may be one or more processors 502, such that the processor 502 comprises a single central-processing unit, or a plurality of processing units capable of executing instructions and performing operations in parallel with each other, commonly referred to as a parallel processing environment.

The computer system 500 may be a conventional computer, a distributed computer, or any other type of computer, such as one or more external computers made available via a cloud/remote server computing architecture. The presently described technology is optionally implemented in software stored on the data stored device(s) 504, stored on the memory device(s) 506, and/or communicated via one or more of the ports 508-512, thereby transforming the computer system 500 in FIG. 5 to a special purpose machine for implementing the operations described herein. Examples of the computer system 500 include personal computers, terminals, workstations, mobile phones, tablets, laptops, personal computers, multimedia consoles, gaming consoles, set top boxes, vehicles, and the like.

The one or more data storage devices 504 may include any non-volatile data storage device capable of storing data generated or employed within the computing system 500, such as computer executable instructions for performing a computer process, which may include instructions of both application programs and an operating system (OS) that manages the various components of the computing system 500. The data storage devices 504 may include, without limitation, magnetic disk drives, optical disk drives, solid state drives (SSDs), flash drives, and the like. The data storage devices 504 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 506 may include volatile memory (e.g., dynamic random access memory (DRAM), static random access memory (SRAM), etc.) and/or non-volatile memory (e.g., read-only memory (ROM), flash memory, etc.). In one embodiment, data collected regarding the road surface characteristics and/or road friction coefficients may be stored in data storage device 504 and/or memory device 506.

Computer program products containing mechanisms to effectuate the systems and methods in accordance with the presently described technology may reside in the data storage devices 504 and/or the memory devices 506, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 500 includes one or more ports, such as an input/output (I/O) port 508, a communication port 510, and a sub-systems port 512, for communicating with other computing, network, or vehicle devices. It will be appreciated that the ports 508-512 may be combined or separate and that more or fewer ports may be included in the computer system 500.

The I/O port 508 may be connected to an I/O device, or other device, by which information is input to or output from the computing system 500. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 500 via the I/O port 508. Similarly, the output devices may convert electrical signals received from computing system 500 via the I/O port 508 into signals that may be sensed as output by a human, such as sound, light, and/or touch. The input device may be an alphanumeric input device, including alphanumeric and other keys for communicating information and/or command selections to the processor 502 via the I/O port 508. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 500 via the I/O port 508. For example, an electrical signal generated within the computing system 500 may be converted to another type of signal, and/or vice-versa. In one implementation, the environment transducer devices sense characteristics or aspects of an environment local to or remote from the computing device 500, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 500, such as, physical movement of some object (e.g., a mechanical actuator), heating or cooling of a substance, adding a chemical substance, and/or the like.

In one implementation, a communication port 510 is connected to a network by way of which the computer system 500 may receive network data useful in executing the methods and systems set out herein as well as transmitting information and network configuration changes determined thereby. Stated differently, the communication port 510 connects the computer system 500 to one or more communication interface devices configured to transmit and/or receive information between the computing system 500 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 510 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. For example, transport system 102 may use communication port 510 to communicate with a secondary transport system for exchange of road surface characteristics and measurements. Further, the communication port 510 may communicate with an antenna for electromagnetic signal transmission and/or reception. In some examples, an antenna may be employed to receive Global Positioning System (GPS) data to facilitate determination of a location of a machine, vehicle, or another device.

The computer system 500 may include a sub-systems port 512 for communicating with one or more systems related to a vehicle to control an operation of the vehicle and/or exchange information between the computer system 500 and one or more sub-systems of the vehicle. Examples of such sub-systems of a vehicle, include, without limitation, imaging systems, RADAR, LIDAR, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

In an example implementation, surface monitoring information and software and other modules and services may be embodied by instructions stored on the data storage devices 504 and/or the memory devices 506 and executed by the processor 502. The computer system 500 may be integrated with or otherwise form part of a vehicle. In some instances, the computer system 500 is a portable device that may be in communication and working in conjunction with various systems or sub-systems of the vehicle.

The present disclosure recognizes that the use of such information may be used to the benefit of users. For example, the location information of a vehicle may be used to provide targeted information concerning a "best" path or route to the vehicle and to avoid surface hazards. Accordingly, use of such information enables calculated control of an autonomous vehicle. Further, other uses for location information that benefit a user of the vehicle are also contemplated by the present disclosure.

Users can selectively block use of, or access to, personal data, such as location information. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses and not share or sell the data outside of those legitimate uses. Such collection should occur only after receiving the users' informed consent. Furthermore, third parties can evaluate these entities to certify their adherence to established privacy policies and practices.

The system set forth in FIG. 5 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium; read only memory (ROM); random access memory (RAM); erasable programmable memory (e.g., EPROM and EEPROM); flash memory; or other types of medium suitable for storing electronic instructions.

The present disclosure recognizes that the use of such information may be used to the benefit of users. For example, the location information of a vehicle may be used to provide targeted information concerning a "best" path or route to the vehicle and to avoid surface hazards. Accordingly, use of such information enables calculated control of an autonomous vehicle. Further, other uses for location information that benefit a user of the vehicle are also contemplated by the present disclosure.

Users can selectively block use of, or access to, personal data, such as location information. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses and not share or sell the data outside of those legitimate uses. Such collection should occur only after receiving the users' informed consent. Furthermore, third parties can evaluate these entities to certify their adherence to established privacy policies and practices.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for managing device operation comprising:
receiving lateral force measurements from a first device connected to a first vehicle as the first device is in communication with a road surface;
estimating road friction coefficients of the road surface based at least on the received lateral force measurements;
collecting a first set of road surface characteristics sensor measurements from a first set of sensors of the first vehicle;
combining the estimated road friction coefficients and the collected first set of road surface characteristics sensor measurements to generate a training data set associated with operation of the first vehicle;
deriving a regression function from the training data set, wherein the regression function predicts real-time road friction coefficients of the road surface; and storing the regression function in a remote server in communication with the first vehicle through a communication network.

2. The method of claim 1 further comprising;
retrieving, at a second vehicle, the regression function for predicting the real-time road friction coefficients from the remote server;
obtaining a second set of road surface characteristics sensor measurements from a second set of sensors;
estimating the real-time road friction coefficients using the regression function and the second set of road surface characteristics sensor measurements obtained from the second set of sensors.

3. The method of claim 1, wherein the first set of sensors include at least one of an object sensor, a textural sensor, a light detection and ranging (LiDAR) sensor, a radio detection and ranging sensor (RADAR), or a camera.

4. The method of claim 2, wherein the second set of sensors include at least one of LiDAR sensors, RADAR sensors, or cameras on the second vehicle.

5. The method of claim 4, wherein a third vehicle transfers a third set of road surface characteristics sensor measurements to the second vehicle, wherein the third set of road surface characteristics sensor measurements is used to estimate the real-time road friction coefficients of the second vehicle through the regression function.

6. The method of claim 1 further comprising transmitting the first set of collected road surface characteristics sensor measurements and the estimated road friction coefficients to the remote server by the first vehicle.

7. The method of claim 1, wherein the first device is an extension trailer connected to the first vehicle and wherein the first device measures the lateral force measurements at a sampling cycle as the trailer is in motion.

8. The method of claim 1, wherein the first device is an onboard mechanical sensor connected to the first vehicle, wherein the onboard mechanical sensor is one of a strain gauge, wheel speed sensor, and a hub force sensor.

9. The method of claim 1, wherein the first vehicle further comprises an inertial measurement unit in conjunction with the first set of road surface characteristics sensor measurements for estimating the real-time road friction coefficients of the first vehicle.

10. The method of claim 1 wherein the first vehicle further comprises a global navigation satellite system unit in conjunction with the first set of road surface characteristics sensor measurements for estimating the real-time road friction coefficients of the first vehicle.

11. A system comprising:
a first device connected to a first vehicle;
a first set of sensors detecting a first set of road surface characteristics sensor measurements;
a processor; and
a non-transitory computer-readable medium storing instructions that, when executed by the processor, cause the processor to perform the operations of:
obtaining an estimated road friction coefficients of a road surface from lateral force measurements acquired from the first device as the first device is in communication with the road surface;
receiving the first set of road surface characteristics sensor measurements from the first set of sensors;
generating a training data set associated with the first vehicle using the estimated road friction coefficients and the collected first set of road surface characteristics sensor measurements;

deriving a regression function from the training data set, wherein the regression function predicts real-time road friction coefficients of the road surface; and
storing the regression function in a remote server in communication with the first vehicle through a communication network.

12. The system of claim 11 further comprising:
a second vehicle comprising a second set of sensors collecting a second set of road surface characteristics sensor measurements, wherein the second vehicle retrieves the regression function for predicting the real-time road friction coefficients from the remote server and estimates the real-time road friction coefficients using the regression function and the second set of road surface characteristics sensor measurements obtained from the second set of sensors.

13. The system of claim 11, wherein the first set of sensors include at least one of an object sensor, a textural sensor, light detection and ranging (LiDAR) sensor, a radio detection and ranging (RADAR), or a camera.

14. The system of claim 12, wherein the second set of sensors include LiDAR sensors, RADAR sensors, or cameras on the second vehicle.

15. The system of claim 14, wherein a third vehicle transfers a third set of road surface characteristics sensor measurements to the second vehicle, wherein the third set of road surface characteristics sensor measurements is used to estimate the real-time road friction coefficients of the second vehicle through the regression function.

16. The system of claim 12, wherein the processor further transmits the first set of collected road surface characteristics sensor measurements and the estimated road friction coefficients to the remote server.

17. The system of claim 12, wherein the first device is an extension trailer is connected to the first vehicle, and wherein the first device measures the lateral force measurements at a sampling cycle as the extension trailer is in motion.

18. The system of claim 12, wherein the first device is an onboard mechanical sensor connected to the first vehicle and wherein the onboard mechanical sensor is one of a strain gauge, wheel speed sensor, and a hub force sensor.

19. The system of claim 12, wherein the first vehicle further comprises an inertial measurement unit and a global navigation satellite system unit in conjunction with the first set of road surface characteristics sensor measurements for estimating the real-time road friction coefficients of the first vehicle.

20. A non-transitory computer-readable data storage medium comprising instructions that, when executed by at least one processor of a first vehicle, cause the first vehicle to perform operations comprising:
receiving lateral force measurements from a first device connected to the first vehicle as the first device is in communication with a road surface;
estimating road friction coefficients of the road surface based at least on the received lateral force measurements;
collecting a first set of road surface characteristics sensor measurements from a first set of sensors of the first vehicle;
combining the estimated road friction coefficients and the collected first set of road surface characteristics sensor measurements to generate a training data set associated with operation of the first vehicle;

deriving a regression function from the training data set, wherein the regression function predicts real-time road friction coefficients of the road surface; and storing the regression function in a remote server in communication with the first vehicle through a communication network.

21. The non-transitory computer-readable data storage medium of claim 20, further comprising;

retrieving, at a second vehicle, the regression function for predicting the real-time road friction coefficients from the remote server;

obtaining a second set of road surface characteristics sensor measurements from a second set of sensors;

estimating the real-time road friction coefficients using the regression function and the second set of road surface characteristics sensor measurements obtained from the second set of sensors.

22. The non-transitory computer-readable data storage medium of claim 21, wherein the second set of sensors include at least one of LiDAR sensors, RADAR sensors, or cameras on the second vehicle.

23. The method of claim 21, wherein a third vehicle transfers a third set of road surface characteristics sensor measurements to the second vehicle, wherein the third set of road surface characteristics sensor measurements is used to estimate the real-time road friction coefficients of the second vehicle through the regression function.

24. The non-transitory computer-readable data storage medium of claim 20, further comprising transmitting the first set of collected road surface characteristics sensor measurements and the estimated road friction coefficients to the remote server by the first vehicle.

25. The non-transitory computer-readable data storage medium of claim 20, wherein the first device is an extension trailer connected to the first vehicle and wherein the first device measures the lateral force measurements at a sampling cycle as the trailer is in motion.

26. The non-transitory computer-readable data storage medium of claim 20, wherein the first device is an onboard mechanical sensor connected to the first vehicle, wherein the onboard mechanical sensor is one of a strain gauge, wheel speed sensor, and a hub force sensor.

27. The non-transitory computer-readable data storage medium of claim 20, wherein the first vehicle further comprises an inertial measurement unit in conjunction with the first set of road surface characteristics sensor measurements for estimating the real-time road friction coefficients.

28. The non-transitory computer-readable data storage medium of claim 20, wherein the first vehicle further comprises a global navigation satellite system unit in conjunction with the first set of road surface characteristics sensor measurements for estimating the real-time road friction coefficients.

29. The non-transitory computer-readable data storage medium of claim 20, wherein the first set of sensors include at least one of an object sensor, a textural sensor, a light detection and ranging (LiDAR) sensor, a radio detection and ranging sensor (RADAR), or a camera.

* * * * *